US008171066B2

(12) United States Patent
Isaacson et al.

(10) Patent No.: US 8,171,066 B2
(45) Date of Patent: May 1, 2012

(54) TECHNIQUES FOR ACCESSING REMOTE FILES

(75) Inventors: Scott Alan Isaacson, Woodland Hills, UT (US); Nithya Balachandran, Bangalore (IN); R. Shyamsundar, Bangalore (IN); Haripriya Srinivasaraghavan, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/284,018

(22) Filed: Oct. 28, 2011

(65) Prior Publication Data

US 2012/0047170 A1 Feb. 23, 2012

Related U.S. Application Data

(63) Continuation of application No. 12/115,652, filed on May 6, 2008.

(51) Int. Cl.
*G06F 17/30* (2006.01)
(52) U.S. Cl. ...................................................... 707/827
(58) Field of Classification Search .................. 707/827
See application file for complete search history.

(56) References Cited

U.S. PATENT DOCUMENTS

2004/0236798 A1 * 11/2004 Srinivasan et al. ............ 707/200

* cited by examiner

*Primary Examiner* — Truong Vo
(74) *Attorney, Agent, or Firm* — Osha • Liang LLP

(57) ABSTRACT

Techniques for accessing remote files are presented. A local user, via a local client, requests access to a file. A local file system determines that the file is associated with a junction. The junction is resolved and an associated remote file system is contacted by the local file system to acquire results for the request. The local file system then delivers the results to the local user via the local client.

10 Claims, 3 Drawing Sheets

TECHNIQUES FOR ACCESSING REMOTE FILES

CROSS-REFERENCE TO RELATED APPLICATIONS

The present application is a continuation application of and, thereby, claims priority under 35 U.S.C. §120 to U.S. application Ser. No. 12/115,652, filed May 6, 2008, entitled, "TECHNIQUES FOR ACCESSING REMOTE FILES," and incorporated herein by reference.

BACKGROUND

Many modern day operating systems (OS's) have file systems that include the ability to mount a remote file system at a mount point on the local file system for purposes of giving the impression of a single file system that spans both a local partition and a remote file system. The remote file system might be another partition on the local disk or it might be a remote file system that is accessed by a protocol such as Netware Core Protocol (NCP), Server Message Block Protocol (SMB)/Common Internet File System Protocol (CIFS), or Network File System Protocol (NFS).

Any remotely mounted file system adds significant value and works well when there are no changes in disk hardware or servers that support the remote file systems; however, when there are changes, the amount and scope of the reconfiguration management steps are significant and grow exponentially with the number of nodes and mount points needed.

For example, consider a server "A" that has a remote mount point to server "B." The mount point on server A includes the identity of server B as well a some sort of location information for B, called "Loc(B)." If Loc(B) ever changes, then the mount point has to be updated. Take for example, if Loc(B) is the IP Address of B and B's address is changed, the mount point on A must be updated. If Loc(B) is the Domain Name Service (DNS) name of B, then B can change its address because the DNS server will then serve up the new address of B and in this case the mount point on A need not be updated. If the location of the file system on B moves, then the mount point on A must be updated. If the file system itself moves from B to C, then the mount point on A must be updated. So, in many cases, if the data on or the location of or even the identity of B ever changes, then the mount points on A must be updated.

Now consider 100 servers, A1 through A100, which all have mount points to B. Whenever there is a change to the data on B or the location of B then every mount point on every server A1 through A100 must be updated. Obviously, this is time consuming and inefficient for an enterprise.

Therefore, in most cases, a distributed file system is a better way to access data from a remote server by using junctions rather than mount points. A junction is a file, which includes a globally unique identifier (GUID) that identifies the location of a storage volume housing the data associated with the junction. The GUID's mapping to a specific volume for the data is referenced as an entry in a database. If the final location of the data ever changes, no junctions on file systems need to be updated, only the single entry for that GUID in the database needs to be updated. One of the benefits and drawbacks of using a distributed file system is that client software is needed to handle the junction. If the server returns a junction as the result of a request to access a file on the file system, the client will look up the junction file obtain the GUID and look in the database and then find out where the file system is located that hosts the volume of that file and then will "follow" that link to the server that has the data.

Take the earlier example of servers A and B, but now there is a junction on A to a file system on B. Client C will ask for a file on A, but if it reaches the junction, A will return the junction to the client C. C will then look up the correct location for the junction in the database (by opening the junction file obtaining the GUID and searching the database for the location), which in this case is a path to a file on B, and then will reference the file on B.

Junctions are generally believed to be better than mount points for several reasons. 1) The data from B never has to flow through A in order to reach C. If C needs files that are on A, C talks directly to A. If C finds that files are on B, it will talk directly to B. 2) The junctions are indirect in that the actual location of the data for a junction is stored in the database (via a GUID) rather than on the file system for A. If changes are made to B or where the data is stored on B, only the data in the database needs to be changed (the mapping to the GUID); no changes are needed for any of the junctions on the file system on A.

Junction resolution will continue to work even if a volume is moved between servers. This can be done using a volume manager move and split operations. If the entire server is moved to a different server, the data on the original target server will need to be moved using the volume manager operations to make sure database will be updated correctly. (Currently move/split operations require source and target volumes to be within the same processing management context.)

Accordingly, a distribute file system adds much value to conventional remote mounting approaches, but one potentially limiting drawback of junctions is that there is client software that is needed on each client to correctly process the junction and to talk to the database. In other words, each of the clients in a distribute file system approach has to be aware of and have software to handle junctions. This creates a support issue for an enterprise, similar to the remote mount discussion presented above.

Consequently, there is a need for improved techniques for accessing remote files.

SUMMARY

In various embodiments, techniques for accessing remote files are presented. In an embodiment, a method for accessing a remote file is presented. A request is received for accessing a file from a client. The request is received at a local file system, which processes on a server and which supports the client and multiple additional clients associated with a local processing environment. A path is resolved to the file across a network as a junction. Next, the junction is used for looking up a remote file system over the network that has the file and that is accessible via the path. The remote file system is contacted over the network with the request for access to the file. Finally, results associated with the request are acquired to access the file from the remote file system and the results are delivered to the client.

DETAILED DESCRIPTION

A "resource" includes a user, content, a processing device, a node, a service, an application, a system, a gateway, a directory, a data store, a World-Wide Web (WWW) site, an end-user, groups of users, combinations of these things, etc. The terms "service," "module," "software," and "application" may be used interchangeably herein and refer to a type of software resource that includes instructions, which when executed by a machine performs operations that change the state of the machine and that may produce output.

A "client" or "client workstation" is machine (computer, processing device, etc.) that a user uses to access a network. The client includes a processing environment. As used herein the terms "client," "desktop," "client machine," "client workstation," and "workstation" may be used interchangeably and synonymously.

A "server" is a machine that the client interacts with over a network, such as the Internet. The user, via its client, attempts to establish a connection with the server or to a resource of the server.

Various embodiments of this invention can be implemented in existing network architectures, file systems, browsers, proxies, agents, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, file systems, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
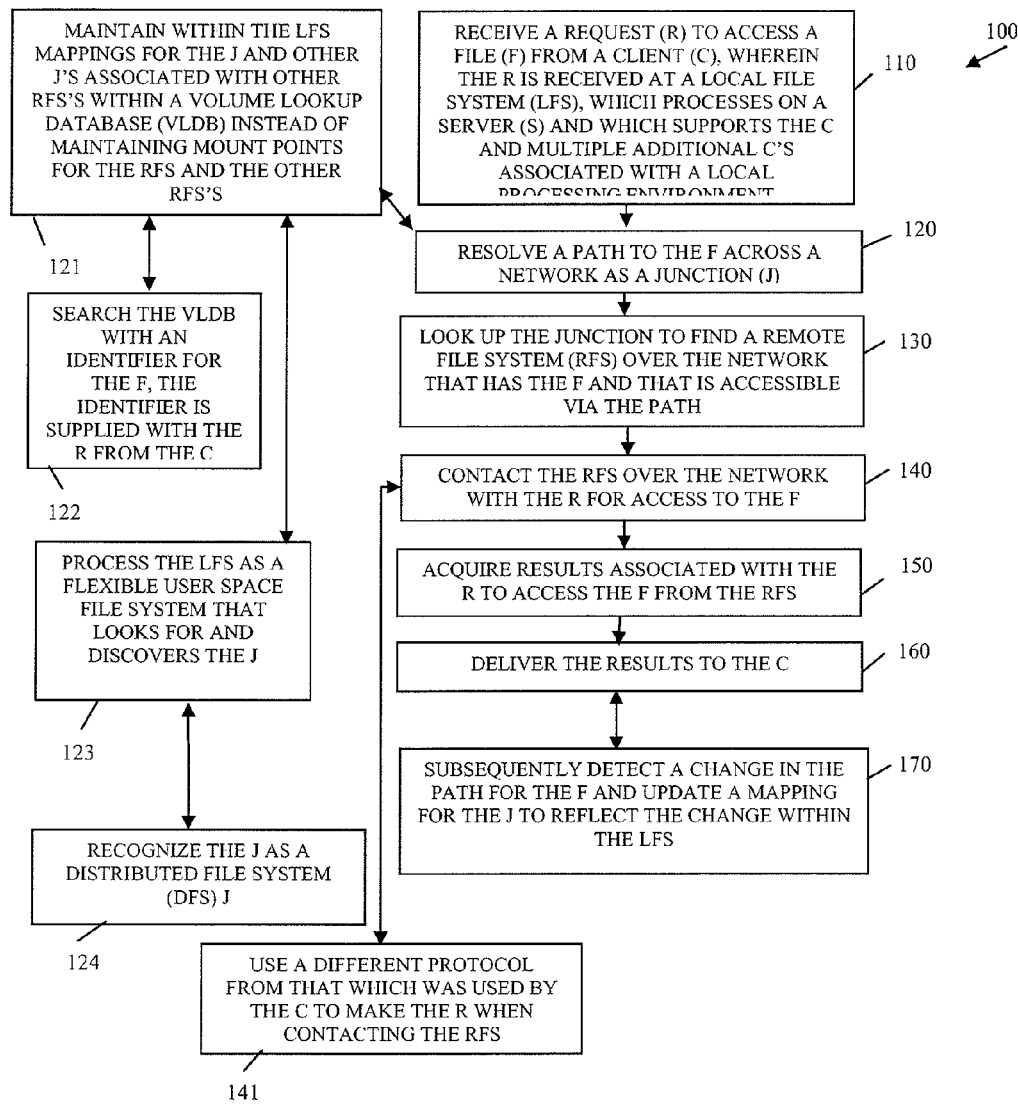
FIG. 1 is a diagram of a method for accessing a remote file, according to an example embodiment.

FIG. 1 is a diagram of a method 100 for accessing a remote file, according to an example embodiment. The method 100 (herein after "local file system service") is implemented as instructions (within a computer-readable storage medium) that process on a server machine (server) over a network and is accessed client machines (clients) of the server. The network may be wired, wireless, or a combination of wired and wireless.

At 110, the local file system service receives a request to access a file from a client. A user or automated application makes the request for access via a client. The request is received and processed at a local file system. The local file system processes on the server and supports multiple additional clients and their users/applications, which are associated with a local processing environment.

In other words, clients (via users or automated applications) make requests for files that are processed by the local file system at the server and in some cases handled by the local file system service. The local file system service handles requests when any file being requested is associated with a remote file system that is remote from the local processing environment over the network, such as over the Internet.

At 120, the local file system service resolves a path to the file across a network as a junction. That is, the path or identifier supplied with the request for access to the file is used to identify that the file being requested is in a remote processing environment from the local file system service and is being managed by a remote file system. The junction provides the ability to resolve the path to a network specific location. The junction is itself a file that includes a GUID for a specific volume of the file being requested, the GUID is mapped to a specific path on the remote file system, such as via a mapping within a database.

According to an embodiment, at 121, the local file system service maintains the junction and other junctions, which are associated with other remote file systems and other remote processing environments within a volume lookup database. That is, the GUID's for remote volumes of remote files and their corresponding mappings are retained in the volume lookup database. This is done instead of maintaining and managing mount points for the remote file system and any other remote file systems. Keeping GUID mappings for volumes of files associated with junctions within a volume lookup database allows for easier maintenance and permits changes to be made to locations of remote file systems and files, such that the dependent clients can each effectuate the changes via a single update to the volume lookup database entry. The actual volume lookup database can reside locally to the local file system service or can be accessed remotely on a remote server by the local file system service.

Moreover, unlike conventional Distribute File Service (DFS) junction processing, the management and usage of the junctions with the techniques discussed herein occur in a centralized location (at the server and with the local file system service or with the local file system) as opposed to the decentralized approach used in convention DFS junction processing. In the conventional approach each client includes software to handle and manage DFS junction lookup and usage, this means any changes in this software has to be updated to all the clients. With the approaches discussed herein, there is a centralized and file system approach to handling and processing DFS junctions.

Continuing with the embodiment discussed at 121, and at 122, the local file system service is enabled for searching the volume database with an identifier for the file being requested. The file identifier is supplied with the original request, which was received from the client. In response to the file identifier, the volume database returns a mapping for the DFS junction (a file that includes a GUID for a remote volume where the file identifier can be found).

In another variation, at 123, the local file system service processes the local file system as a flexible user space file system (FUSE). The FUSE looks for and discovers the junction when needed. Again, in some cases, at 124, the local file system service recognizes the junction as a DFS junction.

It is noted that in some cases (although not discussed above or with reference to FIG. 1), the requests may be for files that are not associated with a remote file system. In such cases, normal local file system processing can be used as there is no need for any junction resolution in those cases. The local file system service recognizes and assists in processing in the manners discussed herein and above when the file access requests are for files that are remote from the local processing environment and remote from the local file system.

At 130, the local file system service looks up the junction (via a junction file to obtain a GUID for the desired volume of the file—the GUID is then mapped to the remote file system via the path) to find a remote file system over the network that has the file and that is accessible via the path.

At 140, the local file system service contacts the remote file system over the network with the request for access to the file. So, the local file system service rather than the client directly interacts with the remote file system that houses the file identified by the junction resolution and the path.

According to an embodiment, at 141, the local file system service uses a different protocol from that which was used by the client to make the request to the local file system. In other words, the communication protocol used between the client and the local file system service can be and in some cases is different from the communication protocol used by the local file system service to communicate with the remote file system.

At 150, the local file system service acquires results associated with the request to access the file from the remote file system. So, any data or confirmations that are associated with the request for accessing the file are acquired by the local file system service from the remote file system.

Next, at 160, the local file system service delivers the results to the original requesting user or automated application via its client.

In this manner, junction processing is achieved in a centralized fashion within the user space of multiple clients that comprise a local processing environment. Conventionally, junction processing is handled via each client of the local processing environment in a decentralized fashion. With the approaches discussed herein, the junction management and file delivery are handled via the local file system service or local file system.

In an embodiment, at 170, the local file system service subsequently detects a change in the path for the file and updates the junction to reflect the change within the local file system when a volume for the path is detected as having been changed. In other words, as file locations change from remoter server to new remote server (volume to volume) or from file path location to new file path structure (different locations within a same volume), the corresponding junction is updated once for all the clients of the local processing environment in the local file system. Again, this can be achieved by changing the GUID mappings and not the actual GUID's included in junction files, it is the mappings that are updated; so technically the junctions themselves remain unchanged.

Consider the following illustrating to highlight the processing of the local file system service.

A client (can be local to the local processing environment or in some cases remote from the local processing environment) via some client-server access protocol makes a read/write request for some file path, say: "/D1/D2/F2" or "/D1/F1." The local file system service on the file system server resolves the paths supplied to a junction, such as "J1" but does not return this to the client for further processing (which would be the case in the conventional situations). The local file system service is implemented in the user space, such as FUSE. In this example, the local file system service looks for J1 in a volume lookup database (VLDB) by opening J1 and obtaining a GUID that is searched for in the VLDB. The VLDB then returns the location of the junction, which in the example case being presented is "B:/D2." The local file system service then directly talks with B looking for "/D2/F2." B returns the data or result of the file request back to the file system service. The local file system service then returns the data or result of the file request back to the client. So, the client was totally unaware of and did not have to be concerned with any junction processing and yet the client still benefits from the junction processing done by the local file system service from the server and on behalf of the client.

Again it is appreciated that the local file system service provides a server-based approach to junction processing. So, special client-side processing to handle junctions is not needed. In this manner, even clients not enabled for junction processing can be integrated and use the local file system service and realize the full benefits of junctions. This also provides for an improved remotely mounted file system experience for LINUX and UNIX users than the current kernel based mount point functionality. Still further the techniques presented herein continue to leverage the fact that server to server communication can in fact use different protocols than the client access protocols to realize access of remote file systems.

Moreover, the techniques allow for data to be moved or changed from one remote server to another or to a different location on a first server without requiring O(N×M) updates to all of the mount points where N is the number of servers with M mount points. The number of updates needed with the techniques presented herein is O(V) where V<N or M and V is the number of junctions on the VLDB. So, users have the same file system experience as could be realized with kernel changes but only use changes occurring to user-space code (server file system). Also, better interoperability with remote file systems is permitted along with their various access protocols without requiring client libraries to be implemented and deployed on the various clients that might be accessing the file data.

Figure 2:
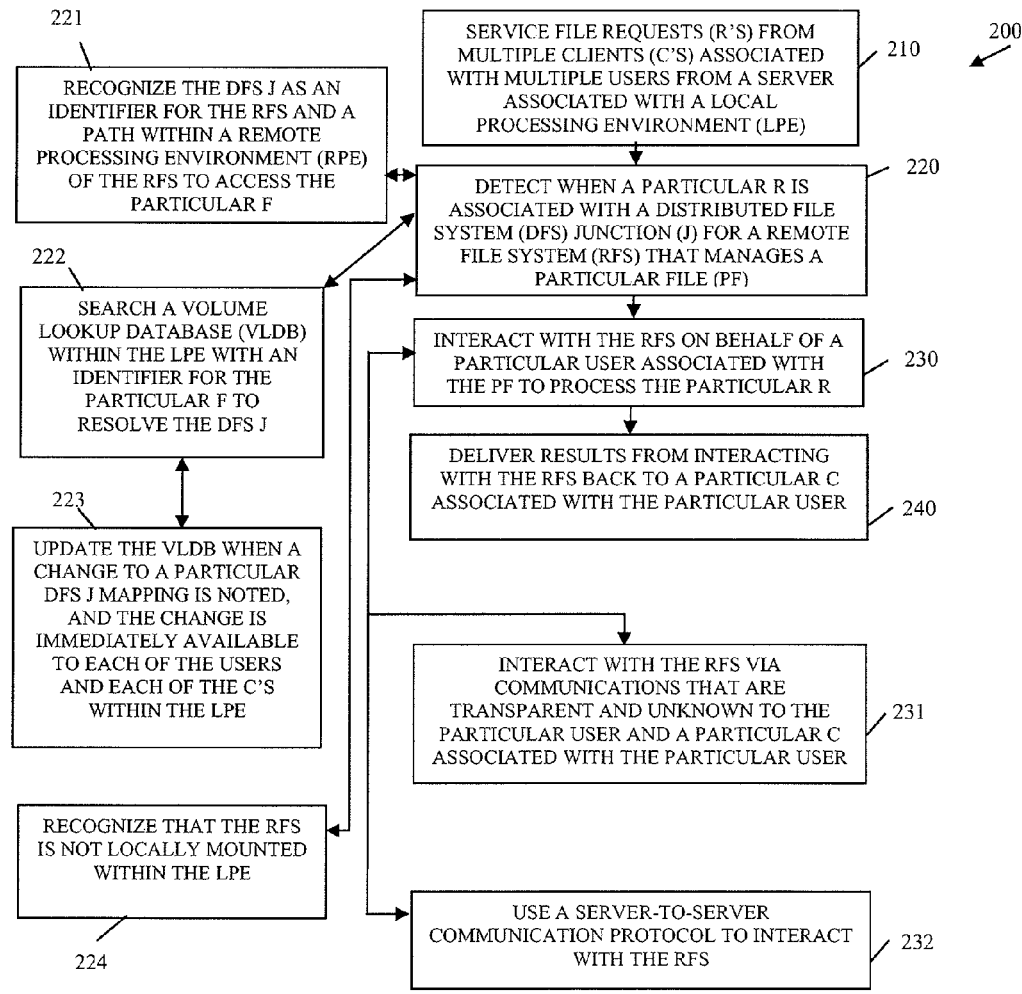
FIG. 2 is a diagram of a method for managing access to remote files, according to an example embodiment.

FIG. 2 is a diagram of a method 200 for managing access to remote files, according to an example embodiment. The method 200 (herein after "local file system") is implemented as instructions (within a computer-readable storage medium) that process on a server over a network and is accessed by clients of the network. The network may be wired, wireless, or a combination of wired and wireless.

The local file system presents another perspective of the local file system service presented in detail with reference to the method 100 of the FIG. 1. In some cases, the local file system provides an enhanced perspective to the method 100 of the FIG. 1.

At 210, the local file system services file requests from multiple clients associated with multiple users from a server. The server is associated with a local processing environment. It is noted that clients can be remote and external from the local processing environment and become logically associated with and a part of the local processing environment during a login or authentication process. So, although it is stated that the clients are within the local processing environment this does not just mean in all cases that the clients are within any predefined geographic distance to the local file system and the server. In fact, membership to the local processing environment can be logical and not tied to any geographic distance or presence.

At 220, the local file system detects when a particular request is associated with a distributed file service (DFS) junction from a remote file system that manages the particular file being requested for a particular request.

In an embodiment, at 221, the local file system recognizes the DFS junction as an identifier (GUID) for a volume location (obtained via a mapping in a database) to a remote file system and a path within a remote processing environment of the remote file system for purposes of accessing the particular file.

In another case, at 222, the local file system searches a volume lookup database (VLDB) within the local processing environment with an identifier for the particular file (GUID) to resolve and identify the DFS junction. In some cases, the VLDB is remotely accessible to the local processing environment and is dynamically consulted over the network.

Continuing with the embodiment at 222, and at 223, the local file system notes that the VLDB is updated when a change to a particular DFS junction is detected (location with a GUID associated with a junction is changed). Actually, the server, which is associated with a changed or moved volume, updates and informs the VLDB of the change. The change is immediately available to each of the users and to each of the clients within the local processing environment.

In still another embodiment, at 224, the local file system recognizes that the remote file system is not locally mounted within the local processing environment. This triggers the discovery process for acquiring the junction (to get the GUID) and identifying the remote file system (locating the GUID mapping to the remote file system (remote volume)).

It is noted, that in some cases the remote file system is a completely different file system from that which is associated with the local file system. In other cases, the type of file system associated with the remote file system is the same type as that which is associated with the local file system.

At 230, the local file system interacts with the remote file system on behalf of a particular user associated with a particular file to process the particular request.

According to an embodiment, at 231, the local file system interacts with the remote file system via communications that are transparent and unknown to the particular user and a particular client, which is associated with the particular user.

In some cases, at 232, the local file system uses a server-to-server communication protocol to interact with the remote file system. The protocol used to interact with the clients or the particular client is different.

At 240, the local file system delivers results from interacting with the remote file system back to a particular client, which is associated with the particular user that made the particular request. The particular client may not include any software or support for junction processing and yet the full benefits of junction processing to access remote files are realized via the processing associated with the local file system.

Figure 3:
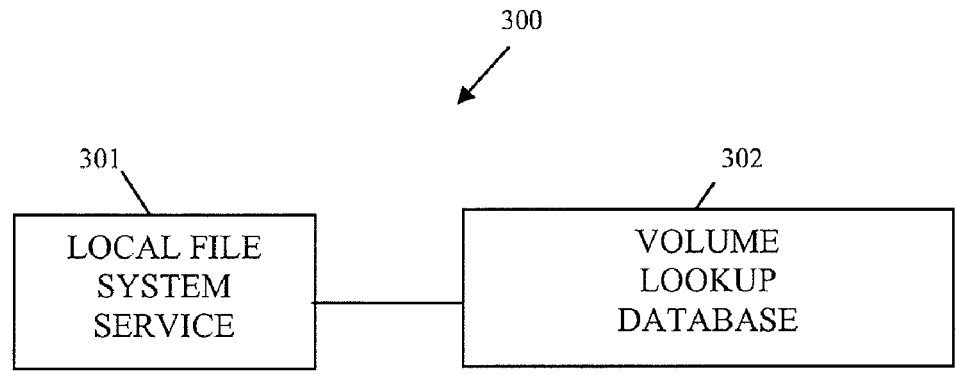
FIG. 3 is a diagram of remote file access system, according to an example embodiment.

FIG. 3 is a diagram of remote file access system 300, according to an example embodiment. The remote file access system 300 is implemented as instructions on or within a machine-accessible and computer-readable storage medium. The instructions when executed by machines (computers or processor-enabled devices) of a network (such as the Internet) perform, among other things, processing depicted with respect to the methods 100 and 200 of the FIGS. 1 and 2, respective. The remote file access system 300 is also operational over a network, and the network may be accessed via a wired connection, a wireless connection, or a combination of wired and wireless connections.

The remote file access system 300 includes a local file system service 301 and a volume lookup database 302. Each of these and their interactions with one another will now be discussed in turn.

The local file system service 301 is implemented in a machine-accessible and computer-readable storage medium and is to process as instructions on a server of the network. Example processing associated with the local file system service 301 was discussed in detail above with reference to the methods 100 and 200 of the FIGS. 1 and 2, respectively.

The local file system service 301 is implemented within a local file system that processes on the server. Also, the local file system services multiple users via their clients.

The local file system service 301 resolves file request to particular remote file systems via searching of the volume lookup database (VLDB) 302. The VLDB 302 may be in the same processing environment as the local file system service 301 or may be in a remote processing environment that is accessible to the local file system service 301. Also, the local file system service 301 directly interacts with those remote file systems to satisfy the file requests on behalf of the users and their clients.

In an embodiment, the local file system is a flexible user space (FUSE) file system.

According to an embodiment, the local file system service 301 uses different communication protocols to communicate with the remote file systems from that which is associated with the local file system service 301 when it communicates with the clients of the users. In other words, a different communication protocol is used to interact with the remote file systems from that which is used to interact with the clients of the local processing environment.

The VLDB 302 is implemented in a machine-accessible and computer-readable storage medium on the server of the network and accessible to and managed by the local file system service 301.

In an embodiment, the VLDB 302 includes mappings between volume identifiers for files and the remote file systems. The mappings are represented via DFS junctions (GUID's) and locations for those DFS junctions.

In a particular situation, when a particular location for a particular file, which is associated with a particular file request, is changed, the local file system service 301 updates a single entry in the VLDB 302 to show an updated particular DFS junction (updated GUID to location mapping within the VLDB 302).

Figure 4:
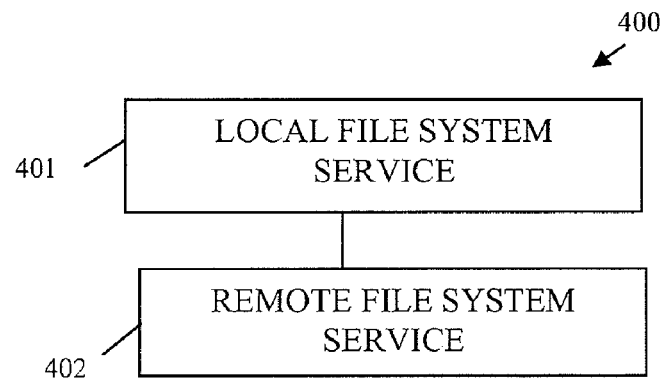
FIG. 4 is a diagram of another remote file access system, according to an example embodiment.

FIG. 4 is a diagram of another remote file access system 400, according to an example embodiment. The remote file access system 400 is implemented as instructions on or within a machine-accessible and computer-readable storage medium. The instructions when executed by machines (computers or processor-enabled devices) of a network (such as the Internet) perform, among other things, processing depicted with respect to the methods 100 and 200 of the FIGS. 1 and 2, respectively. The remote file access system 400 is also operational over a network, and the network is wired, wireless, or a combination of wired and wireless. The remote file access system 400 presents another and in some cases enhanced perspective of the remote file access system 300 represented by the FIG. 3.

The remote file access system 400 includes a local file system service 401 and remote file system service 402. Each of these and their interactions with one another will now be discussed in turn.

The local file system service 401 is implemented in a machine-accessible and computer-readable storage medium and to process on a local server of the network relative to users and their clients. Although, the users and clients may be logically a member of the local processing environment associated with the local server, such as when they authenticate and log into the local server via a remote device or site over the network. Example processing associated with the local file system service 401 was presented in detail above with respect to the methods 100 and 200 and the system 300 of the FIGS. 1-3, respectively.

The local file system service 401 determines when a file is requested from a particular client whether that file is being managed by the remote file system service 402. If this is the case, then the local file system service 401 directly communicates with the remote file system service 402 to acquire results for the requested file. The results are then delivered by the local file system service 401 to the particular requesting client. This is done without remote mounting techniques and is done via junction control in a centralized and server based administrative approach.

So, in an embodiment, the local file system service 401 determines an identity for the remote file system service 402 (remove volume) via a DFS junction lookup within a data store. The data store is being managed locally by the local file system service 401, although the data store may be remote from the local file system service 401 the data store itself is managed locally by the local file system service 401.

In a particular case, the local file system service 401 uses a different communication protocol to communicate with the remote file system service 402 from that which is associated with other communications made with the clients by the local file system service 401.

Thus, the particular client(s) is(are) unaware of the communication between the local file system service 401 and the remote file system service 402, which occurs to obtain the results for the original file access request.

The remote file system service 402 is implemented in a machine-accessible and computer-readable storage medium and to process on a remote server of the network relative to the local server.

In some cases the remote file system service 402 is of a same type of file system from that which is associated with the local file system service 401. In other cases, the type of file system associated with the remote file system service 402 is different from that which is associated with the local file system service 401.

It is now appreciated how users via their clients can reap the benefits associated with junctions to access remote files via remote file systems without having to be configured or include software to handle junction processing or to manage remote mounting. This is done in a centralized fashion and within the user space of the clients, via a server-based approach implemented within a local processing environment's file system.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer readable storage medium comprising instructions that, when executed by a processor, perform a method, the method comprising:
   receiving, from a first client via a network, a first request for a file, wherein the first request comprises a file identifier corresponding to a globally unique identifier (GUID);
   querying a volume lookup database (VLDB) using the file identifier to obtain a first junction file mapped to the GUID;
   providing, in response to the first request, the file to the first client by obtaining the file from a first remote file system (RFS) located using the first junction file;
   detecting, after providing the file to the first client in response to the first request, that a network location for the file has changed from the first RFS to a second RFS;
      wherein detecting that the network location for the file has changed from the first RFS to the second RFS comprises: detecting that the file has been moved from a first server to a second server, wherein the first RFS is executing on the first server, and wherein the second RFS is executing on the second server;
   mapping, based on the detection, the GUID to a second junction file corresponding to the second RFS;
   receiving, from the first client, a second request for the file, wherein the second request comprises the file identifier;
   querying the VLDB using the file identifier to obtain the second junction file mapped to the GUID; and
   providing, in response to the second request, the file to the first client by obtaining the file from the second RFS located using the second junction file.

2. The computer readable storage medium of claim 1, the method further comprising:
   receiving, from a second client, a third request for the file, wherein the third request comprises the file identifier;
   querying the VLDB using the file identifier to obtain the second junction file mapped to the GUID; and
   providing, in response to the third request, the file to the second client by obtaining the file from the second RFS located using the second junction file.

3. The computer readable storage medium of claim 1, wherein the GUID is one of a plurality of GUIDs mapped to the second junction file.

4. The computer readable storage medium of claim 1, wherein the GUID identifies a specific volume, and wherein the file identifier is a path to a location of the file within the specific volume.

5. The computer readable storage medium of claim 1, wherein the VLDB is located on a computer system, and wherein querying the VLDB comprises sending a query, via the network, to the computer system.

6. A system comprising:
   a volume lookup database (VLDB) comprising:
      a first junction file corresponding to a first remote file system (RFS), and
      a second junction file corresponding to a second RFS,
      wherein the first junction file is mapped to a globally unique identifier (GUID); and a local file system service executing on a processor, configured to:
   receive, from a first client via a network, a first request for a file, wherein the first request comprises a file identifier corresponding to the GUID;
   query the VLDB using the file identifier to obtain the first junction file;
   provide, in response to the first request, the file to the first client by obtaining the file from the first RFS located using the first junction file;
   detect, after providing the file to the first client in response to the first request, that a network location for the file has changed from the first RFS to the second RFS;
      wherein detecting that the network location for the file has changed from the first RFS to the second RFS comprises: detecting that the file has been moved from a first server to a second server, wherein the first RFS is executing on the first server, and wherein the second RFS is executing on the second server;

map, based on the detection, the GUID to the second junction file;

receive, from the first client, a second request for the file, wherein the second request comprises the file identifier;

query the VLDB using the file identifier to obtain the second junction file mapped to the GUID; and provide, in response to the second request, the file to the first client by obtaining the file from the second RFS located using the second junction file.

7. The system of claim 6, wherein the local file system service is further configured to:

receive, from a second client, a third request for the file, wherein the third request comprises the file identifier;

query the VLDB using the file identifier to obtain the second junction file mapped to the GUID; and provide, in response to the third request, the file to the second client by obtaining the file from the second RFS located using the second junction file.

8. The system of claim 6, wherein the GUID is one of a plurality of GUIDs mapped to the second junction file.

9. The system of claim 6, wherein the GUID identifies a specific volume, and wherein the file identifier is a path to a location of the file within the specific volume.

10. The system of claim 6, wherein the VLDB is located on a computer system, and wherein querying the VLDB comprises sending a query, via the network, to the computer system.

* * * * *